United States Patent
Gill (10) Patent No.: US 6,633,461 B2
(45) Date of Patent: Oct. 14, 2003

(54) DUAL TUNNEL JUNCTION SENSOR ANTIFERROMAGNETIC LAYER BETWEEN PINNED LAYERS

(75) Inventor: Hardayal Singh Gill, Palo Alto, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 279 days.

(21) Appl. No.: 09/813,908

(22) Filed: Mar. 20, 2001

(65) Prior Publication Data

US 2002/0135946 A1 Sep. 26, 2002

(51) Int. Cl.$^7$ ............ G11B 5/127; G11B 5/33; G11B 5/39
(52) U.S. Cl. ............................... 360/314; 360/324.2
(58) Field of Search ................... 360/314, 324.11, 360/324.12, 313, 317, 324, 324.1, 324.2, 110

(56) References Cited

U.S. PATENT DOCUMENTS

| | | | | |
|---|---|---|---|---|
| 5,627,703 A | * | 5/1997 | Smith | 360/314 |
| 5,695,864 A | | 12/1997 | Slonczewski | 428/212 |
| 5,715,121 A | | 2/1998 | Sakakima et al. | 360/324.2 |
| 5,768,066 A | | 6/1998 | Akiyama et al. | 360/314 |
| 5,796,560 A | | 8/1998 | Saito et al. | 360/324 |
| 5,859,753 A | | 1/1999 | Ohtsuka et al. | 360/314 |
| 6,185,080 B1 | * | 2/2001 | Gill | 360/324.2 |
| 6,278,589 B1 | * | 8/2001 | Gill | 360/314 |

2002/0196591 A1 * 12/2002 Hujanen et al. ............ 360/326

FOREIGN PATENT DOCUMENTS

| | | |
|---|---|---|
| JP | 11163436 | 6/1999 |
| JP | 11177161 | 7/1999 |
| JP | 11238925 | 8/1999 |

OTHER PUBLICATIONS

*IBM Technical Discl. Bulletin* vol. 40 n. 4, Apr. 1997 "Spin Valve Head with Series . . . ".
*IEEE Transactions on Magnetics* vol. 35 n. 2, Mar. 1999 "Spin Valve and Dual Spin Valve . . . " p. 55–660.
*Research Disclosure*, Dec. 1999, p. 1717.
*Research Disclosure*, Apr. 2000, p. 752.

* cited by examiner

Primary Examiner—Julie Anne Watko
(74) Attorney, Agent, or Firm—Ervin F. Johnston (57) ABSTRACT

A dual tunnel junction sensor operates without the requirement of first and second shield layers. This is accomplished by making first and second free layer structures antiparallel (AP) coupled structures. The first free layer structure has first and second AP coupled layers and the second free layer structure has third and fourth AP coupled layers. The thicknesses of the first and third AP coupled layers, which are preferably equal, are different from the thicknesses of the second and fourth AP coupled layers, which are also preferably equal. Field signals from perpendicular or longitudinally recorded magnetic disks rotate the magnetic moments of the first and second free layer structures so that resistances on each side of a pinning layer are additive. Extraneous field signals, other than signal fields from the rotating magnetic disk, are cancelled by common mode rejection.

30 Claims, 7 Drawing Sheets

DUAL TUNNEL JUNCTION SENSOR ANTIFERROMAGNETIC LAYER BETWEEN PINNED LAYERS

BACKGROUND OF THE INVENTION

1. Field of the Invention

The present invention relates to a dual tunnel junction sensor without shield layers and, more particularly, to such a dual tunnel junction sensor which has first and second antiparallel (AP) coupled free layer structures which no not require shielding.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a tunnel junction sensor for sensing the magnetic signal fields from the rotating magnetic disk. The sensor includes an insulative tunneling or barrier layer sandwiched between a ferromagnetic pinned layer and a ferromagnetic free layer. An antiferromagnetic pinning layer interfaces the pinned layer for pinning the magnetic moment of the pinned layer 90° to an air bearing surface (ABS) wherein the ABS is an exposed surface of the sensor that faces the rotating disk. The tunnel junction sensor is located between ferromagnetic first and second shield layers. First and second leads, which may be the first and second shield layers, are connected to the tunnel junction sensor for conducting a tunneling current ($I_T$) therethrough. The tunneling current ($I_T$) is conducted perpendicular to the major film planes (CPP) of the sensor as contrasted to a spin valve sensor where the tunneling current ($I_T$) is conducted parallel to the major film planes (CIP) of the spin valve sensor. A magnetic moment of the free layer is free to rotate upwardly and downwardly with respect to the ABS from a quiescent or zero bias point position in response to positive and negative magnetic signal fields from the rotating magnetic disk. The quiescent position of the magnetic moment of the free layer, which is parallel to the ABS, is when the tunneling current ($I_T$) is conducted through the sensor without magnetic field signals from the rotating magnetic disk.

When the magnetic moments of the pinned and free layers are parallel with respect to one another the resistance of the tunnel junction sensor to the tunneling current ($I_T$) is at a minimum and when their magnetic moments are antiparallel the resistance of the tunnel junction sensor to the tunneling current ($I_T$) is at a maximum. Changes in resistance of the tunnel junction sensor is a function of cos θ, where θ is the angle between the magnetic moments of the pinned and free layers. When the tunneling current ($I_T$) is conducted through the tunnel junction sensor resistance changes, due to signal fields from the rotating magnetic disk, cause potential changes that are detected and processed as playback signals. The sensitivity of the tunnel junction sensor is quantified as magnetoresistive coefficient dr/R where dr is the change in resistance of the tunnel junction sensor from minimum resistance (magnetic moments of free and pinned layers parallel) to maximum resistance (magnetic moments of the free and pinned layers antiparallel) and R is the resistance of the tunnel junction sensor at minimum resistance. The dr/R of a tunnel junction sensor can be on the order of 40% as compared to 10% for a spin valve sensor.

The first and second shield layers may engage the bottom and the top respectively of the tunnel junction sensor so that the first and second shield layers serve as leads for conducting the tunneling current ($I_T$) through the tunnel junction sensor perpendicular to the major planes of the layers of the tunnel junction sensor. The tunnel junction sensor has first and second side surfaces which are normal to the ABS. First and second hard bias layers abut the first and second side surfaces respectively of the tunnel junction sensor for longitudinally biasing the magnetic domains of the free layer. This longitudinal biasing also maintains the magnetic moment of the free layer parallel to the ABS when the read head is in a quiescent condition.

A dual tunnel tunnel junction sensor has been proposed for increasing the magnetoresistive coefficient dr/R by combining resistances of the dual tunnel junction sensor on each side of an antiferromagnetic pinning layer. The dual tunnel junction sensor includes the antiferromagnetic pinning layer which is located between and exchange coupled to each of the first and second pinned layers for pinning magnetic moments of the first and second pinned layers parallel with respect to each other and perpendicular to the ABS. The first and second pinned layers are located between first and second barrier layers and the first and second barrier layers are located between first and second free layer structures. The first and second free layer structures are, in turn, typically located between first and second shield layers for shielding the sensor from all extraneous fields except a signal field from a rotating magnetic disk. Since there are many layers in the dual tunnel junction sensor, the resistance of the sensor is high. Unfortunately, noise is proportional to the resistance which causes a high resistance tunnel junction sensor to produce unwanted noise. There is a strong-felt need to provide dual tunnel junction sensors which have low noise.

SUMMARY OF THE INVENTION

The present invention significantly reduces the noise of a dual tunnel junction sensor by eliminating the first and second shield layers. This is accomplished by making the first and second free layer structures first and second antiparallel (AP) coupled structures. The first free layer structure includes a first antiparallel coupling (APC) layer which is located between and interfaces each of the first and second antiparallel (AP) coupled layers and the second free layer structure is a second antiparallel coupling (APC) layer which is located between and interfaces each of the third and fourth AP coupled layers. Each of the first, second, third and fourth AP coupled layers has a magnetic moment. The magnetic moments of the first and fourth AP coupled layers are parallel with respect to each other and the magnetic moments of the second and third AP coupled layers are parallel with respect to each other. Further, the magnetic moments of the first and fourth AP coupled layers are antiparallel with respect to the magnetic moments of the second and third AP coupled layers. This causes the magnetic moments of the second and third AP coupled layers next to the first and second barrier layers respectively to be in-phase so that signal fields from the rotating magnetic disk will be additive on each side of the pinning layer. In one embodiment of the invention the magnetic moment of the first AP coupled layer is greater than the magnetic moment of the second AP coupled layer and the magnetic moment of the third AP coupled layer is greater than the magnetic moment of the fourth AP coupled layer. In the preferred embodiment the magnetic moment of the first AP coupled layer is equal to the magnetic moment of the third AP coupled layer and the magnetic moment of the second AP coupled layer is equal to the magnetic moment of the fourth AP coupled layer.

In the operation of the invention first and second antiparallel signal fields from a perpendicular recorded magnetic disk result in a first signal field rotating the magnetic moment of the first AP coupled layer which, in turn, rotates the magnetic moment of the second AP coupled layer next to the first barrier layer and a second signal field rotates the third AP coupled layer next to the second barrier layer. The rotations of the magnetic moments of the second and third AP coupled layers are in the same direction so that they are in-phase. If the rotation makes these magnetic moments more parallel with respect to the magnetic moments of the pinned layers, the resistance on each side of the pinning layer decreases and if the rotation makes the magnetic moments of the second and third AP coupled layers more antiparallel with respect to the magnetic moments of the pinned layers, the resistance on each side of the pinning layers increases. With the above arrangement, extraneous fields do not impact the sensor because of common mode rejection. An extraneous field will cause the magnetic moments of the second and third AP coupled layers to go in opposite directions which will cause resistances of equal magnitudes but opposite signs on each side of the pinning layer to completely counterbalance each other.

Since shields are not used, the tunnel junction sensor can have a greater stripe height and width so as to further reduce the resistance of the tunnel junction sensor and thereby reduce noise. It should be noted that when shields are used there is a restriction on the height due to lower flux decay length for the shielded case. In the above-described embodiment the read gap is defined by the centers of the first and third AP coupled layers. The present invention is also capable of reading longitudinally recorded magnetic disks. Another advantage of the invention is that the field signals from the rotating magnetic disk can propagate further up into the height of the tunnel junction sensor which increases the signal of the sensor. Another aspect of the invention is to employ electrically nonconductive first and second lead layers in the place of the first and second shield layers. These lead layers can serve the purpose of conducting the tunneling current through the sensor as well as dissipating heat.

An object of the present invention is to provide a low noise dual tunnel junction sensor.

Another object is to provide a low noise tunnel junction sensor which is unshielded, generates less heat and has an increased signal output.

Other objects and attendant advantages of the invention will be appreciated upon reading the following description taken together with the accompanying drawings.

DESCRIPTION OF THE PREFERRED EMBODIMENTS

Magnetic Disk Drive

Figures 1, 2:
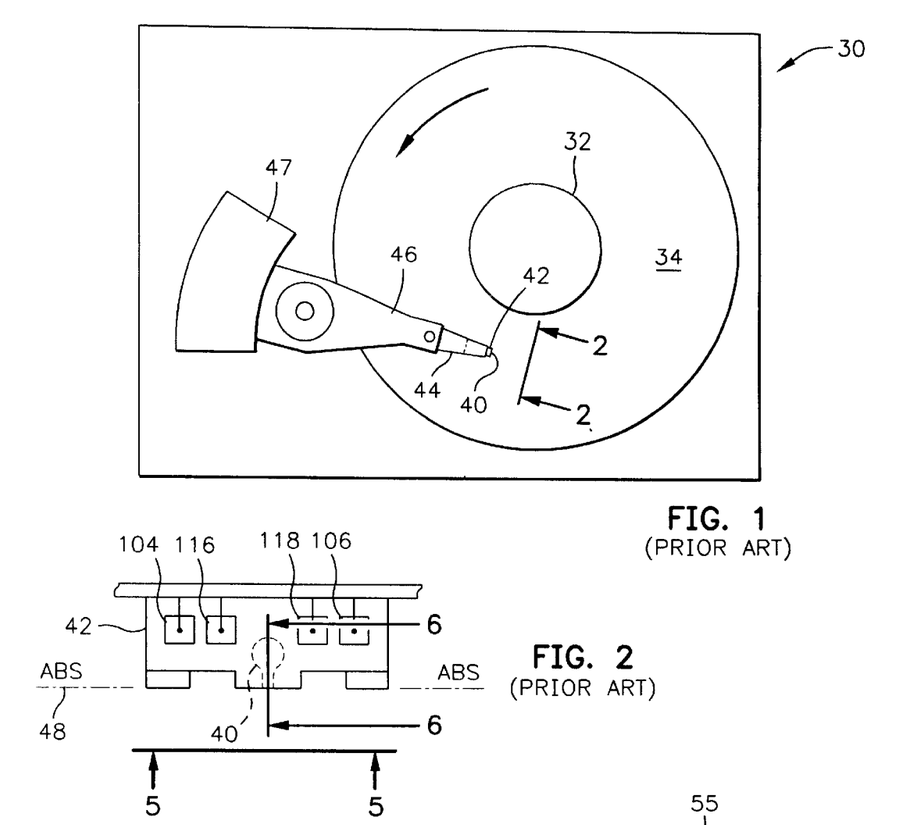
FIG. 1 is a plan view of an exemplary magnetic disk drive.
FIG. 2 is an end view of a slider with a magnetic head of the disk drive as seen in plane 2—2 of FIG. 1.
Figure 3:
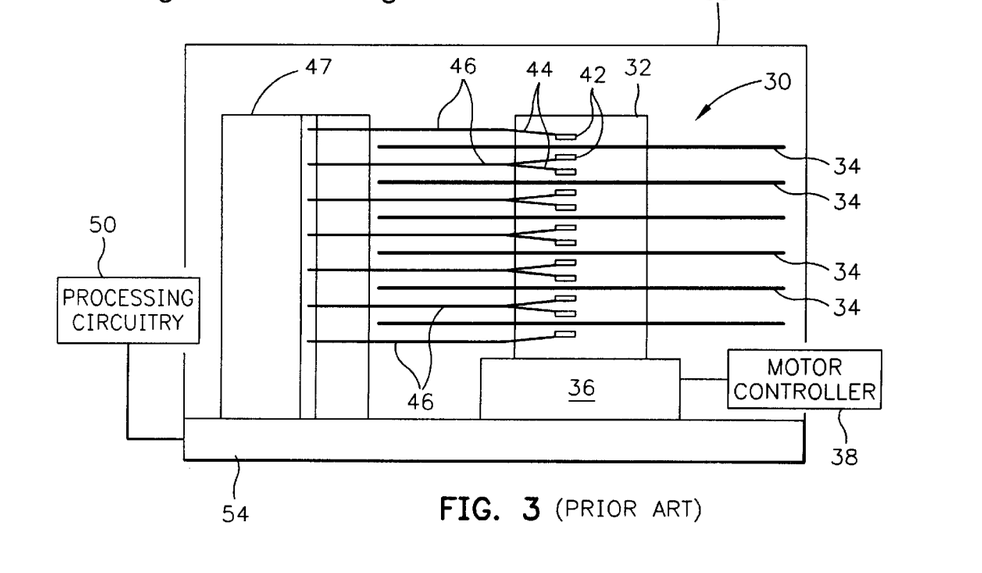
FIG. 3 is an elevation view of the magnetic disk drive wherein multiple disks and magnetic heads are employed.
Figure 4:
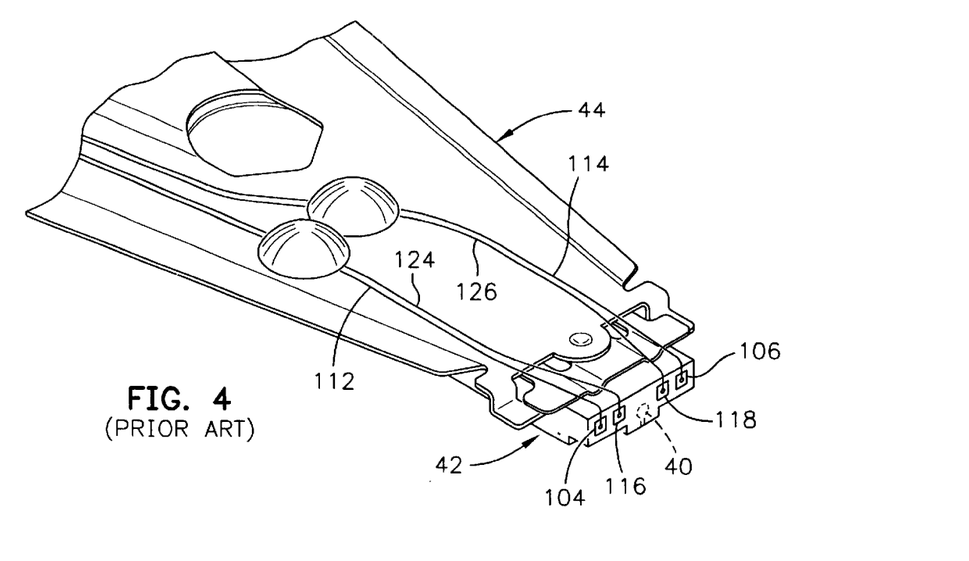
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
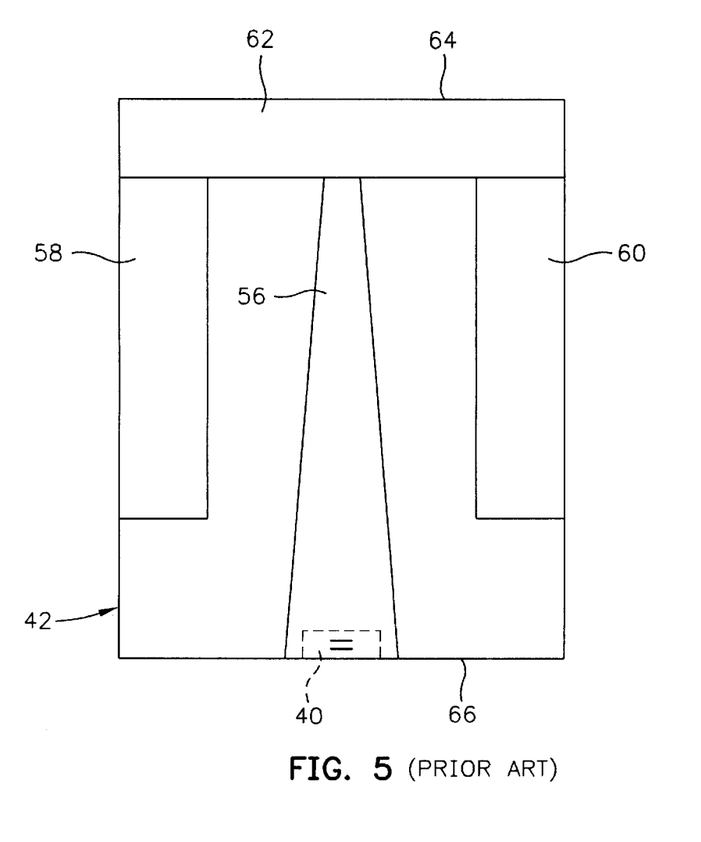
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
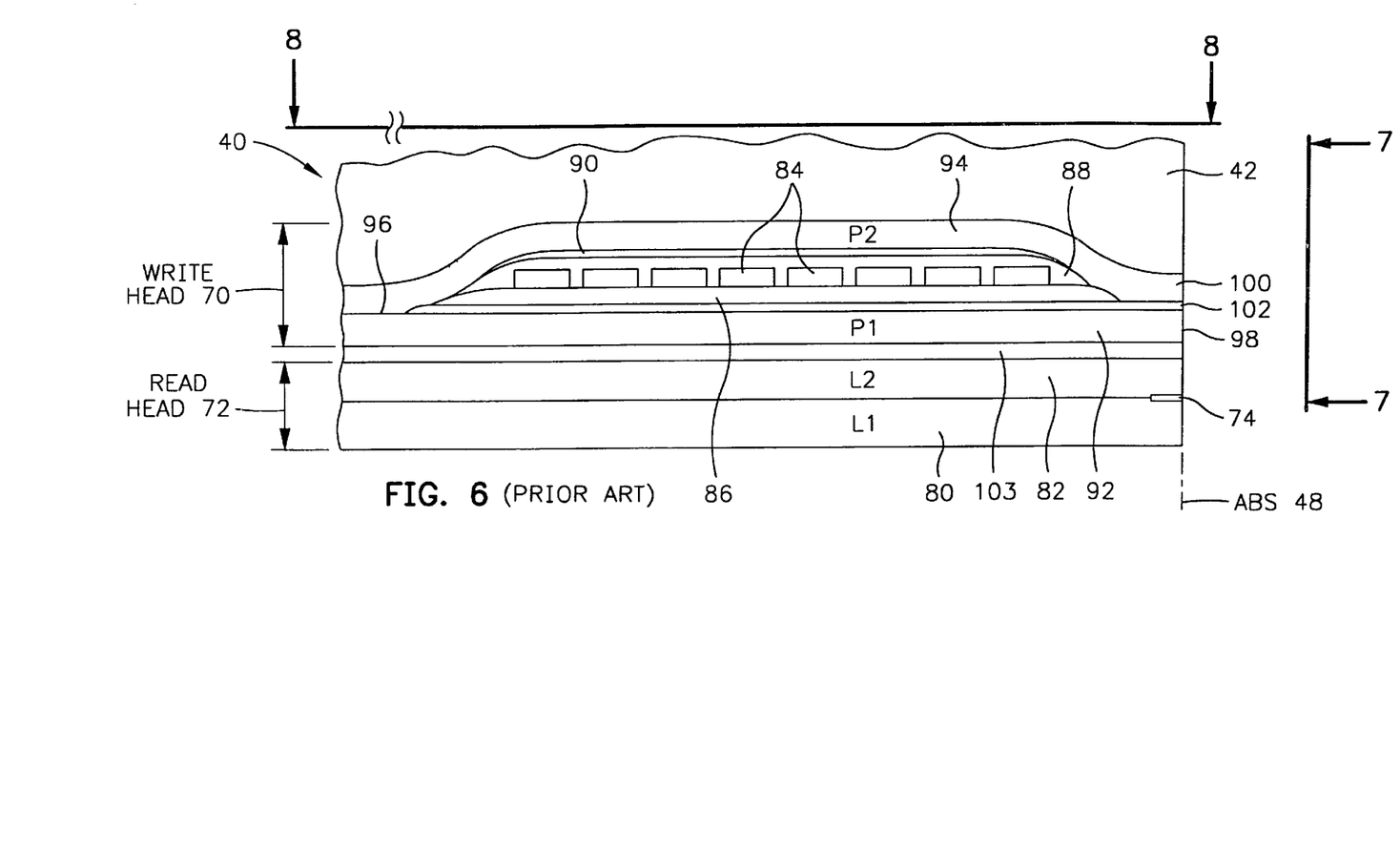
FIG. 6 is a partial view of the slider and a piggyback magnetic head as seen in plane 6—6 of FIG. 2.
Figure 7:
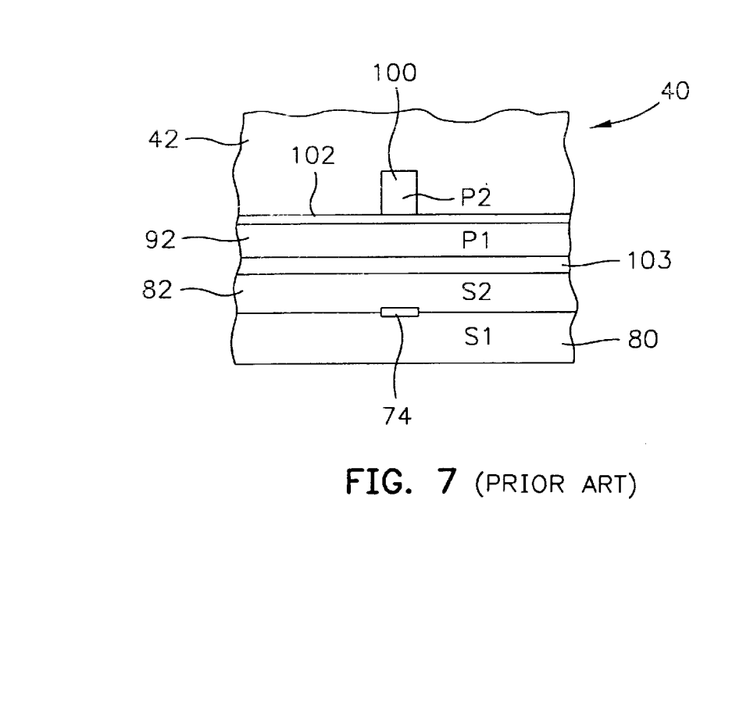
FIG. 7 is a partial ABS view of the slider taken along plane 7—7 of FIG. 6 to show the read and write elements of the magnetic head.
Figure 8:
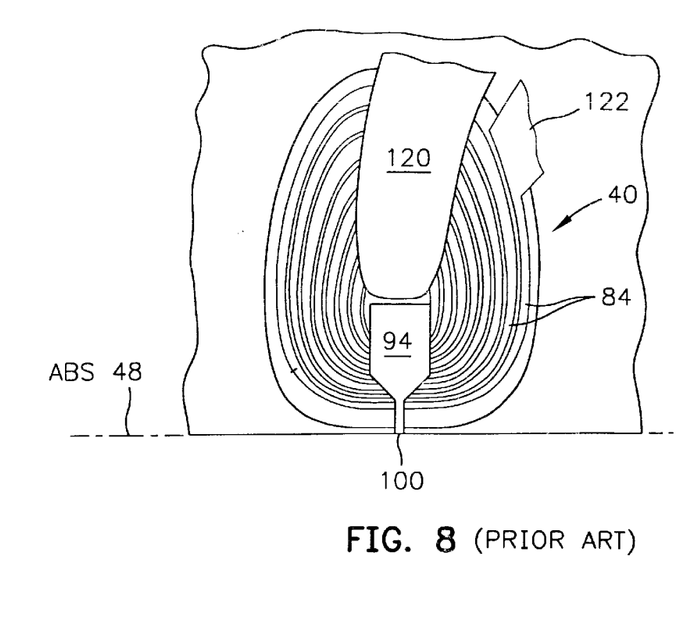
FIG. 8 is a view taken along plane 8—8 of FIG. 6 with all material above the coil layer and leads removed.

FIG. 6 is a side cross-sectional elevation view of a magnetic head 40, which includes a write head portion 70 and a read head portion 72, the read head portion employing a tunnel junction sensor 74 of the present invention. FIG. 7 is an ABS view of FIG. 6. The tunnel junction sensor 74 is sandwiched between ferromagnetic first and second shield layers 80 and 82. In response to external magnetic fields, the resistance of the spin valve sensor 74 changes. A tunneling current ($I_T$) conducted through the sensor causes these resistance changes to be manifested as potential changes. These potential changes are then processed as readback signals by the processing circuitry 50 shown in FIG. 3. The tunneling current ($I_T$) may be conducted through the tunnel junction sensor 74 perpendicular to the planes of its film surfaces by the first and second shield layers 80 and 82 which serve as first and second leads.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. As shown in FIGS. 2 and 4, first and second solder connections 104 and 106 connect leads from the tunnel junction sensor 74 to leads 112 and 114 on the suspension 44, and third and fourth solder connections 116 and 118 connect leads 120 and 122 from the coil 84 (see FIG. 10) to leads 124 and 126 on the suspension.

Figure 9:
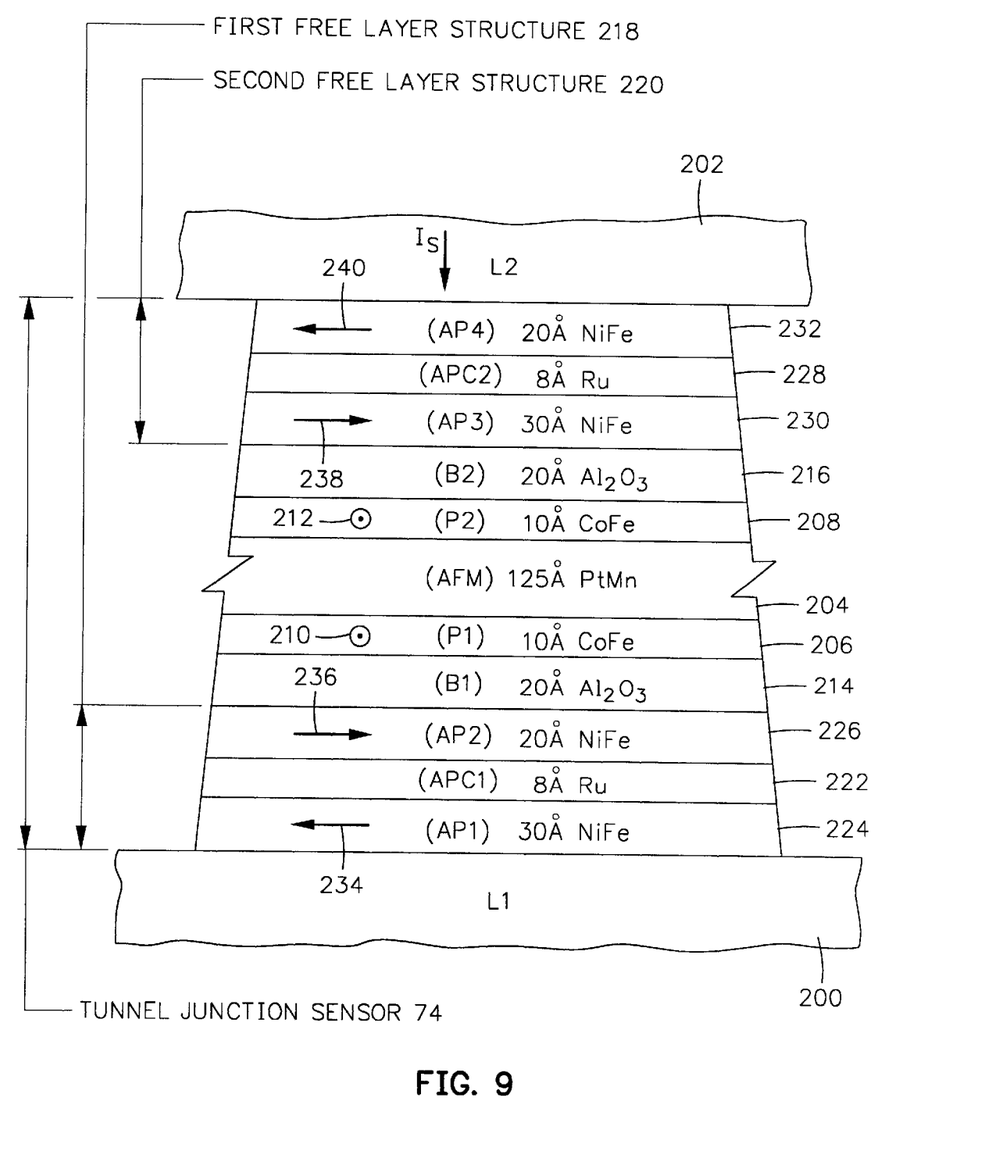
FIG. 9 is an enlarged ABS illustration of the present dual tunnel junction read head.

FIG. 9 shows an ABS illustration of the present dual tunnel junction sensor 74. In the preferred embodiment the sensor 74 is located between nonmagnetic electrically conductive first and second lead layers (L1) 200 and (L2) 202 for conducting a tunneling current ($I_T$) through the sensor perpendicular to the major planes of the layers of the sensor. It should be noted that the embodiment shown in FIG. 9 differs from the embodiments shown in FIGS. 6 and 7 in that the first and second shield layers (S1) and (S2) 80 and 82 are omitted. This is made possible by the present invention.

The sensor 74 includes an antiferromagnetic (AFM) pinning layer 204 which is located between and is exchange coupled to first and second pinned layers (P1) and (P2) 206 and 208. The pinning layer 204 pins first and second magnetic moments 210 and 212 of the first and second pinned layers perpendicular to the ABS in a direction either into the sensor or out of the sensor, as shown in FIG. 9. The first and second pinned layers 206 and 208 are located between nonmagnetic electrically insulative first and second barrier layers (B1) and (B2) 214 and 216. The first and second barrier layers 214 and 216 are, in turn, located between a first free layer structure 218 and a second free layer structure 220.

Each of the first and second free layer structures 218 and 220 are antiparallel (AP) coupled structures. The first free layer structure 218 includes a first antiparallel coupling layer (APC1) 222 which is located between first and second antiparallel coupled layers (AP1) and (AP2) 224 and 226. The second free layer structure 220 includes a second antiparallel coupling layer (APC2) 228 which is located between third and fourth antiparallel coupled layers (AP3) and (AP4) 230 and 232.

First, second, third and fourth magnetic moments 234, 236, 238 and 240 of the first, second, third and fourth AP coupled layers 224, 226, 230 and 232 respectively are oriented parallel to the ABS and to the major planes of the layers of the sensor. By a strong antiparallel coupling between the first and second AP coupled layers 224 and 226 the magnetic moments 234 and 236 are antiparallel with respect to one another. Again, by a strong antiparallel coupling between the third and fourth AP coupled layers 230 and 232, the magnetic moments 238 and 240 are antiparallel with respect to one another.

Exemplary thicknesses and materials of the layers are 30 Å of nickel iron for the first AP coupled layer 224, 8 Å of ruthenium for the first antiparallel coupling layer 222, 20 Å of nickel iron for the second AP coupled layer 226, 20 Å of aluminum oxide for the first barrier layer 214, 10 Å pf cobalt iron for the first pinned layer 206, 125 Å of platinum manganese for the pinning layer 204, 10 Å of cobalt iron for the second pinned layer 208, 20 Å of aluminum oxide for the second barrier layer 216, 30 Å of nickel iron for the third AP coupled layer 230, 8 Å of ruthenium for the second AP coupled layer 228 and 20 Å of nickel iron for the fourth AP coupled layer 232.

Figure 10:
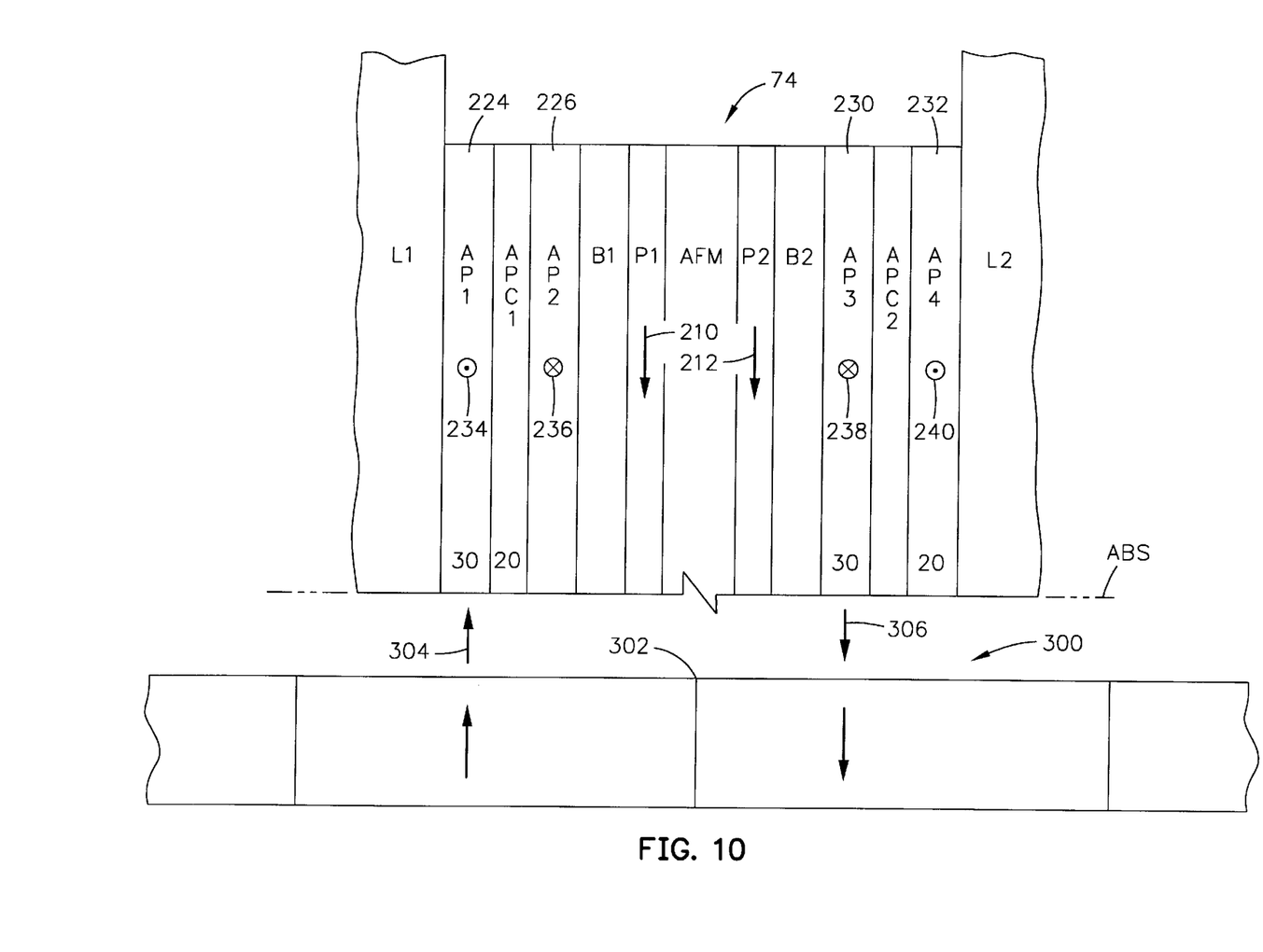
FIG. 10 is a side view of the present dual tunnel junction sensor in relationship to a perpendicularly recorded magnetic disk.

The operation of the invention can be visualized in reference to FIGS. 9 and 10. FIG. 10 is a side view of the dual tunnel junction sensor 74 in conjunction with a perpendicular recorded magnetic disk 300. Between a transition 302 are positive and negative signal fields 304 and 306 which propagate into the sensor. Since the first AP coupled layer 224 is the thickest layer in the first free layer structure 218, and the third AP coupled layer 230 is the thickest layer in the second free layer structure 220, these layers control the rotations of the magnetic moments of the free layer structures. Accordingly, the field signal 304 will rotate the magnetic moment 234 upwardly into the head which will rotate the magnetic moment 236 downwardly out of the head. The field signal 306 will rotate the magnetic moment 238 downwardly out of the head which will rotate the magnetic moment 240 upwardly into the head. The result is that the magnetic moments 236 and 238 will be rotated in the same direction, namely out of the head, which makes the magnetic moment 236 more parallel with respect to the magnetic moment 210 of the first pinned layer and the magnetic moment 238 more parallel with respect to the magnetic moment 212 of the second pinned layer. This will cause the resistance changes on each side of the pinning layer 204, which are decreased, to be additive. Likewise, if the signal fields 304 and 306 were reversed in their directions, the magnetic moment 236 would become more antiparallel with respect to the magnetic moment 210 and the magnetic moment 238 would become more antiparallel with respect to the magnetic moment 212. In this instance, the resistance on each side of the pinning layer 204 increases and are additive.

Figure 11:
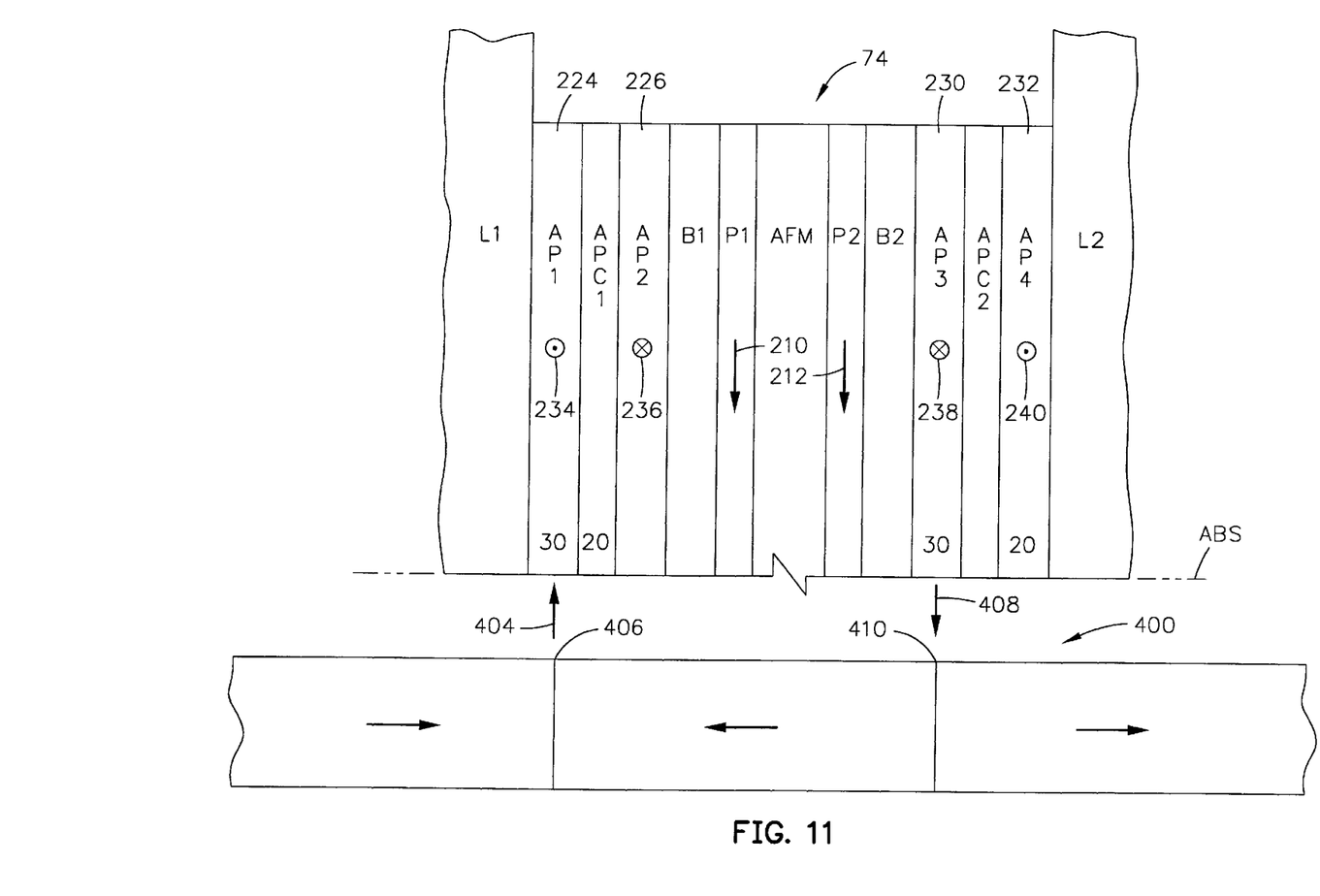
FIG. 11 is a side view of the present dual tunnel junction sensor in combination with a longitudinally recorded magnetic disk.

FIG. 11 is a side view of the spin valve sensor 74 in combination with a longitudinally recorded magnetic disk 400. Assuming a positive field signal 404 at transition 406 and a negative signal 408 at transition 410, the result would be the same as described hereinabove for FIG. 10.

In the preferred embodiment the first and second lead layers 200 and 202 are made of copper. It should be noted that without the first and second shield layers shown in FIGS. 6 and 7 that the resistance of the sensor to the tunneling current ($I_T$) is reduced. This will, in turn, reduce the noise of the dual tunnel junction sensor 74. Further, without the shield layers the height and width of the dual tunnel junction sensor 74 can be increased which will further reduce the resistance and noise of the sensor. Still further, without the first and second shield layers the field signals will propagate further into the sensor which will increase its output signal. It is significant to note that extraneous signals, other than field signals from the rotating magnetic disk, will be rejected by common mode rejection. Assuming an extraneous signal, the magnetic moments 236 and 238 will rotate in opposite directions which will cause an increase in the resistance on one side of the pinning layer 204, which is completely counterbalanced by a decrease in the resistance on the other side of the pinning layer 204.

Discussion

It should be understood that the thicknesses and materials of the layers can be varied as desired. It is important, however, that the appropriate thicknesses be employed for the first and second free layer structures 218 and 220 so as to cause the resistances on each side of the pinning layer to be additive. In the preferred embodiment the thicknesses of the layers of the first and second free layer structures result in a complete counterbalancing of resistances caused by extraneous fields other than the rotating magnetic disk. To accomplish this the thickness of the second AP pinned layer 226 should be equal to the thickness of the fourth AP pinned layer 232 and the thickness of the first AP pinned layer 224 should be equal to the thickness of the third AP pinned layer 230. It should be understood that the invention would also operate if the second and fourth AP coupled layers 226 and 232 were the thicker layers and the first and third AP coupled layers 224 and 230 were the thinner layers. For instance, the first and third AP coupled layers could be 20 Å thick and the second and fourth AP coupled layers 226 and 232 could be 30 Å thick. Further, the magnetic moments 234, 236, 238 and 240 may be reversed in their directions and the magnetic moments 210 and 212 may be reversed in their directions without altering the spirit of the invention. Other materials may be utilized for the pinning layer, such as nickel manganese or palladium manganese. Further, the nickel iron is preferably $Ni_{83}Fe_{17}$ and the cobalt iron is preferably $Co_{90}Fe_{10}$.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head which has an air bearing surface (ABS), comprising:
    a tunnel junction sensor including:
        first and second pinned layers wherein each pinned layer has a magnetic moment;
        an antiferrromagnetic pinning layer located between and exchange coupled to each of the first and second pinned layers for pinning the magnetic moments of the first and second pinned layers parallel with respect to each other and perpendicular to the ABS;
        electrically insulative first and second barrier layers;
        the first and second pinned layers being located between the first and second barrier layers;
        first and second free layer structures;
        the first and second barrier layers being located between the first and second free layer structures;
        the first free layer structure being an antiparallel (AP) coupled structure which includes:
            first and second antiparallel (AP) coupled layers; and
            a first antiparallel coupling (APC) layer located between and interfacing each of the first and second AP coupled layers;
        the second free layer structure being an antiparallel (AP) coupled structure which includes:
            third and fourth antiparallel (AP) coupled layers; and
            a second antiparallel coupling (APC) layer located between and interfacing each of the third and fourth AP coupled layers.

2. A magnetic read head as claimed in claim 1 including:
    nonmagnetic electrically conductive first and second lead layers; and
    the first and second free layer structures being located between the first and second lead layers.

3. A magnetic read head as claimed in claim 1 including:
    each of the first, second, third and fourth AP coupled layers having a magnetic moment;
    the magnetic moments of the first and fourth AP coupled layers being parallel with respect to each other and the magnetic moments of the second and third AP coupled layers being parallel with respect to each other; and
    the magnetic moments of the first and fourth AP coupled layers being antiparallel with respect to the magnetic moments of the second and third AP coupled layers.

4. A magnetic read head as claimed in claim 3 wherein the magnetic moment of the first AP coupled layer is greater than the magnetic moment of the second AP coupled layer and the magnetic moment of the third AP coupled layer is greater than the magnetic moment of the fourth AP coupled layer.

5. A magnetic read head as claimed in claim 4 wherein the magnetic moment of the first AP coupled layer is equal to the magnetic moment of the third AP coupled layer and the magnetic moment of the second AP coupled layer is equal to the magnetic moment of the fourth AP coupled layer.

6. A magnetic read head as claimed in claim 5 including:
    nonmagnetic electrically conductive first and second lead layers; and
    the first and second free layer structures being located between the first and second lead layers.

7. A magnetic head assembly having an air bearing surface (ABS), comprising:
    a write head including:
        ferromagnetic first and second pole piece layers that have a yoke portion located between a pole tip portion and a back gap portion;
        a nonmagnetic write gap layer located between the pole tip portions of the first and second pole piece layers;
        an insulation stack with at least one coil layer embedded therein located between the yoke portions of the first and second pole piece layers; and
        the first and second pole piece layers being connected at their back gap portions;
    a read head including a tunnel junction sensor;
    the tunnel junction sensor including:
        first and second pinned layers wherein each pinned layer has a magnetic moment;
        an antiferrromagnetic pinning layer located between and exchange coupled to each of the first and second pinned layers for pinning the magnetic moments of the first and second pinned layers parallel with respect to each other and perpendicular to the ABS;
        nonmagnetic electrically insulative first and second barrier layers;
        the first and second pinned layers being located between the first and second barrier layers;
        first and second free layer structures;

the first and second barrier layers being located between the first and second free layer structures;

the first free layer structure being an antiparallel (AP) coupled structure which includes:
first and second antiparallel (AP) coupled layers; and
a first antiparallel coupling (APC) layer located between and interfacing each of the first and second AP coupled layers;
the second free layer structure being an antiparallel (AP) coupled structure which includes:
third and fourth antiparallel (AP) coupled layers; and
a second antiparallel coupling (APC) layer located between and interfacing each of the third and fourth AP coupled layers.

8. A magnetic head assembly as claimed in claim 7 including:
nonmagnetic electrically conductive first and second lead layers; and
the first and second free layer structures being located between the first and second lead layers.

9. A magnetic head assembly as claimed in claim 7 including:
each of the first, second, third and fourth AP coupled layers having a magnetic moment;
the magnetic moments of the first and fourth AP coupled layers being parallel with respect to each other and the magnetic moments of the second and third AP coupled layers being parallel with respect to each other; and
the magnetic moments of the first and fourth AP coupled layers being antiparallel with respect to the magnetic moments of the second and third AP coupled layers.

10. A magnetic head assembly as claimed in claim 9 wherein the magnetic moment of the first AP coupled layer is greater than the magnetic moment of the second AP coupled layer and the magnetic moment of the third AP coupled layer is greater than the magnetic moment of the fourth AP coupled layer.

11. A magnetic head assembly as claimed in claim 10 wherein the magnetic moment of the first AP coupled layer is equal to the magnetic moment of the third AP coupled layer and the magnetic moment of the second AP coupled layer is equal to the magnetic moment of the fourth AP coupled layer.

12. A magnetic head assembly as claimed in claim 11 including:
nonmagnetic electrically conductive first and second lead layers; and
the first and second free layer structures being located between the first and second lead layers.

13. A magnetic disk drive including at least one magnetic head assembly that has an a write head, a read head and an air bearing surface (ABS) comprising:
the write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
the read head including a tunnel junction sensor;
the tunnel junction sensor including:
first and second pinned layers wherein each pinned layer has a magnetic moment;
an antiferrromagnetic pinning layer located between and exchange coupled to each of the first and second pinned layers for pinning the magnetic moments of the first and second pinned layers parallel with respect to each other and perpendicular to the ABS;
electrically insulative first and second barrier layers;
the first and second pinned layers being located between the first and second barrier layers;
first and second free layer structures;
the first and second barrier layers being located between the first and second free layer structures;
the first free layer structure being an antiparallel (AP) coupled structure which includes:
first and second antiparallel (AP) coupled layers; and
a first antiparallel coupling (APC) layer located between and interfacing each of the first and second AP coupled layers;
the second free layer structure being an antiparallel (AP) coupled structure which includes:
third and fourth antiparallel (AP) coupled layers; and
a second antiparallel coupling (APC ) layer located between and interfacing each of the third and fourth AP coupled layers;

a housing;
a magnetic disk rotatably supported in the housing;
a support mounted in the housing for supporting the magnetic head assembly with said ABS facing the magnetic disk so that the magnetic head assembly is in a transducing relationship with the magnetic disk;
a spindle motor for rotating the magnetic disk;
an actuator positioning means connected to the support for moving the magnetic head assembly to multiple positions with respect to said magnetic disk; and
a processor connected to the magnetic head assembly, to the spindle motor and to the actuator for exchanging signals with the magnetic head assembly, for controlling movement of the magnetic disk and for controlling the position of the magnetic head assembly.

14. A magnetic disk drive as claimed in claim 13 including:
nonmagnetic electrically conductive first and second lead layers; and
the first and second free layer structures being located between the first and second lead layers.

15. A magnetic disk drive as claimed in claim 13 including:
each of the first, second, third and fourth AP coupled layers having a magnetic moment;
the magnetic moments of the first and fourth AP coupled layers being parallel with respect to each other and the magnetic moments of the second and third AP coupled layers being parallel with respect to each other; and
the magnetic moments of the first and fourth AP coupled layers being antiparallel with respect to the magnetic moments of the second and third AP coupled layers.

16. A magnetic disk drive as claimed in claim 15 wherein the magnetic moment of the first AP coupled layer is greater than the magnetic moment of the second AP coupled layer and the magnetic moment of the third AP coupled layer is greater than the magnetic moment of the fourth AP coupled layer.

17. A magnetic disk drive as claimed in claim 16 wherein the magnetic moment of the first AP coupled layer is equal to the magnetic moment of the third AP coupled layer and the magnetic moment of the second AP coupled layer is equal to the magnetic moment of the fourth AP coupled layer.

18. A magnetic disk drive as claimed in claim 17 including:
nonmagnetic electrically conductive first and second lead layers; and
the first and second free layer structures being located between the first and second lead layers.

19. A method of making a magnetic read head which has an air bearing surface (ABS), comprising the steps of:
making a tunnel junction sensor including the steps of:
forming first and second pinned layers wherein each pinned layer has a magnetic moment;
forming an antiferrromagnetic pinning layer between and exchange coupled to each of the first and second pinned layers for pinning the magnetic moments of the first and second pinned layers parallel with respect to each other and perpendicular to the ABS;
forming electrically insulative first and second barrier layers;
forming the first and second pinned layers between the first and second barrier layers;
forming first and second free layer structures;
forming the first and second barrier layers between the first and second free layer structures;
the first free layer structure being an antiparallel (AP) coupled structure which is made including the steps of:
forming first and second antiparallel (AP) coupled layers; and
forming a first antiparallel coupling (APC) layer located between and interfacing each of the first and second AP coupled layers;
the second free layer structure being an antiparallel (AP) coupled structure which is made including the steps of:
forming third and fourth antiparallel (AP) coupled layers; and
forming a second antiparallel coupling (APC) layer between and interfacing each of the third and fourth AP coupled layers.

20. A method as claimed in claim 19 including the steps of:
forming nonmagnetic first and second lead layers; and
forming the first and second free layer structures being between the first and second lead layers.

21. A method as claimed in claim 19 including:
forming each of the first, second, third and fourth AP coupled layers with a magnetic moment;
forming the magnetic moments of the first and fourth AP coupled layers parallel with respect to each other and forming the magnetic moments of the second and third AP coupled layers parallel with respect to each other; and
forming the magnetic moments of the first and fourth AP coupled layers antiparallel with respect to the magnetic moments of the second and third AP coupled layers.

22. A method as claimed in claim 21 wherein the magnetic moment of the first AP coupled layer is formed greater than the magnetic moment of the second AP coupled layer and the magnetic moment of the third AP coupled layer is formed greater than the magnetic moment of the fourth AP coupled layer.

23. A method as claimed in claim 22 wherein the magnetic moment of the first AP coupled layer is formed equal to the magnetic moment of the third AP coupled layer and the magnetic moment of the second AP coupled layer is formed equal to the magnetic moment of the fourth AP coupled layer.

24. A method as claimed in claim 23 including the steps of:
forming nonmagnetic first and second lead layers; and
forming the first and second free layer structures being between the first and second lead layers.

25. A method of making magnetic head assembly that has an air bearing surface (ABS), comprising the steps of:
making a write head including the steps of:
forming ferromagnetic first and second pole piece layers in pole tip, yoke and back gap regions wherein the yoke region is located between the pole tip and back gap regions;
forming a nonmagnetic nonconductive write gap layer between the first and second pole piece layers in the pole tip region;
forming an insulation stack with at least one coil layer embedded therein between the first and second pole piece layers in the yoke region; and
connecting the first and pole piece layers at said back gap region; and
making a read head which includes a tunnel junction sensor;
making the tunnel junction sensor including the steps of:
forming first and second pinned layers wherein each pinned layer has a magnetic moment;
forming an antiferrromagnetic pinning layer between and exchange coupled to each of the first and second pinned layers for pinning the magnetic moments of the first and second pinned layers parallel with respect to each other and perpendicular to the ABS;
forming electrically insulative first and second barrier layers;
forming the first and second pinned layers between the first and second barrier layers;
forming first and second free layer structures;
forming the first and second barrier layers between the first and second free layer structures;
the first free layer structure being an antiparallel (AP) coupled structure which is formed including the steps of:
forming first and second antiparallel (AP) coupled layers; and
forming a first antiparallel coupling (APC) layer between and interfacing each of the first and second AP coupled layers;
the second free layer structure being an antiparallel (AP) coupled structure which is formed including the steps of:
forming third and fourth antiparallel (AP) coupled layers; and
forming a second antiparallel coupling (APC) layer between and interfacing each of the third and fourth AP coupled layers.

26. A method as claimed in claim 25 including the steps of:
forming nonmagnetic first and second lead layers; and
forming the first and second free layer structures being between the first and second lead layers.

27. A method as claimed in claim 25 including:
forming each of the first, second, third and fourth AP coupled layers with a magnetic moment;

forming the magnetic moments of the first and fourth AP coupled layers parallel with respect to each other and forming the magnetic moments of the second and third AP coupled layers parallel with respect to each other; and forming the magnetic moments of the first and fourth AP coupled layers antiparallel with respect to the magnetic moments of the second and third AP coupled layers.

28. A method as claimed in claim 27 wherein the magnetic moment of the first AP coupled layer is formed greater than the magnetic moment of the second AP coupled layer and the magnetic moment of the third AP coupled layer is formed greater than the magnetic moment of the fourth AP coupled layer.

29. A method as claimed in claim 28 wherein the magnetic moment of the first AP coupled layer is formed equal to the magnetic moment of the third AP coupled layer and the magnetic moment of the second AP coupled layer is formed equal to the magnetic moment of the fourth AP coupled layer.

30. A method as claimed in claim 29 including the steps of:

forming nonmagnetic first and second lead layers; and forming the first and second free layer structures being between the first and second lead layers.

* * * * *